United States Patent [19]

Adama

[11] Patent Number: 4,598,815
[45] Date of Patent: Jul. 8, 1986

[54] POWERED ROLLER DIVERTER

[75] Inventor: David J. Adama, Bedford, Tex.

[73] Assignee: Conveyor Corporation of America, Inc., Crowley, Tex.

[21] Appl. No.: 633,515

[22] Filed: Jul. 23, 1984

[51] Int. Cl.$^4$ ............................................. B65G 47/53
[52] U.S. Cl. ...................................... 198/372; 74/23; 198/598; 198/782
[58] Field of Search ............... 198/366, 367, 372, 598, 198/782, 787; 74/22 R, 23

[56] References Cited

U.S. PATENT DOCUMENTS

| Re. 25673 | 11/1964 | Burt . |
| 2,613,790 | 10/1952 | Schottelkotte . |
| 2,985,274 | 5/1961 | Byrnes et al. . |
| 2,988,196 | 6/1961 | Byrnes et al. . |
| 3,018,873 | 1/1962 | Burt . |
| 3,058,565 | 10/1962 | Byrnes . |
| 3,058,567 | 10/1962 | Byrnes et al. . |
| 3,138,238 | 6/1964 | DeGood et al. . |
| 3,219,166 | 11/1965 | Collins et al. . |
| 3,241,651 | 3/1966 | Colby . |
| 3,254,752 | 6/1966 | Bauch et al. . |
| 3,279,583 | 10/1966 | Abegglen . |
| 3,334,723 | 8/1967 | Reed et al. . |
| 3,370,685 | 2/1968 | Guilie . |
| 3,429,417 | 2/1969 | DeGood et al. . |
| 3,512,638 | 7/1968 | Chengges et al. . |
| 3,565,233 | 2/1971 | Hinman .......................... 198/782 |
| 3,650,375 | 3/1972 | Fleischaver et al. . |
| 3,747,736 | 7/1973 | Kornylak . |
| 3,983,988 | 10/1976 | Maxted et al. . |
| 4,173,274 | 11/1979 | Kantarian et al. . |
| 4,328,889 | 5/1982 | Maxted . |

Primary Examiner—Joseph E. Valenza
Assistant Examiner—Lyle Kim
Attorney, Agent, or Firm—Litman, Day and McMahon

[57] ABSTRACT

A diverter assembly, for diverting baggage from a main belt conveyor to an intersecting conveyor, includes a single row of diverter rollers pivotally mounted therein. The diverter rollers are continuously rotated with power mechanically derived from the main conveyor. The diverter assembly is mounted in a gap formed in the main conveyor and a lift mechanism raises and lowers the diverter rollers while a swivel mechanism simultaneously pivots the rollers so that the articles are diverted. The lift mechanism and swivel mechanism are synchronized, so that when the rollers are lowered they are oriented coaxially to take up very little horizontal space, and to decrease the size of the gap over which articles pass unsupported. When the diverter rollers are raised, however, the rollers are automatically pivoted, in part taking advantage of the greater room available, and the rollers divert articles from the main conveyor.

16 Claims, 18 Drawing Figures

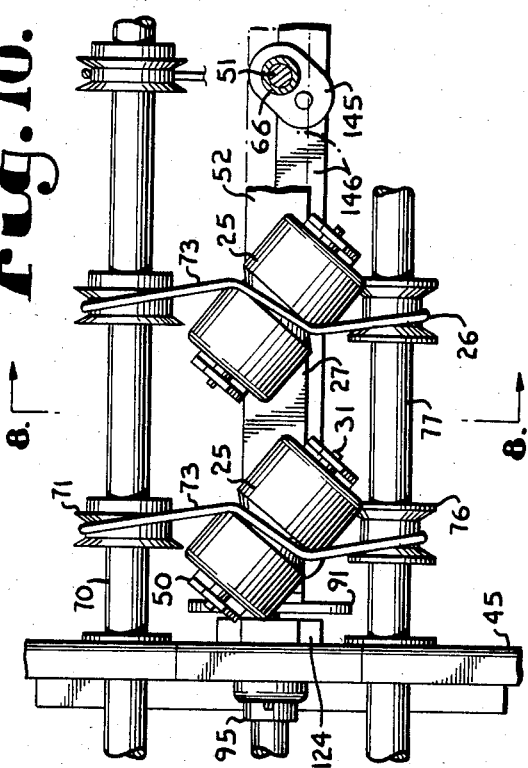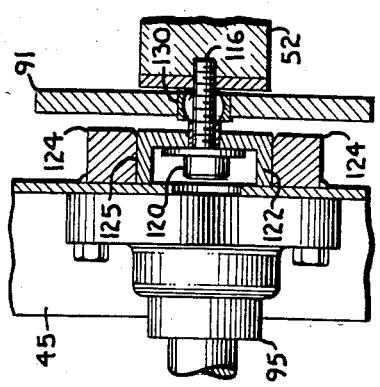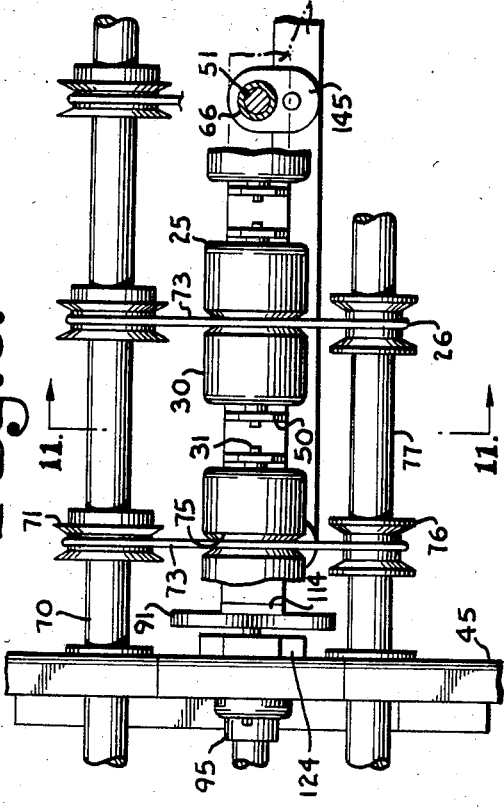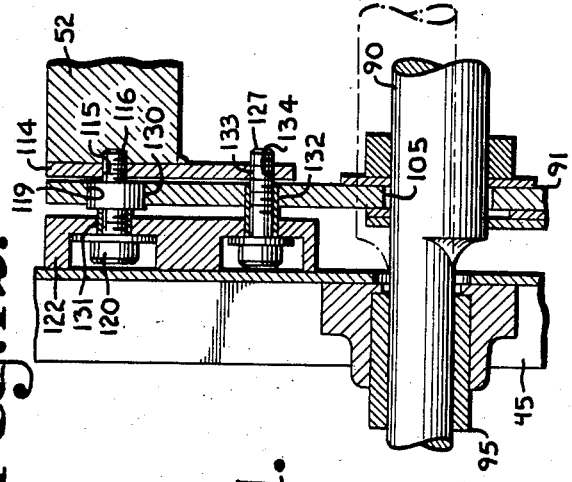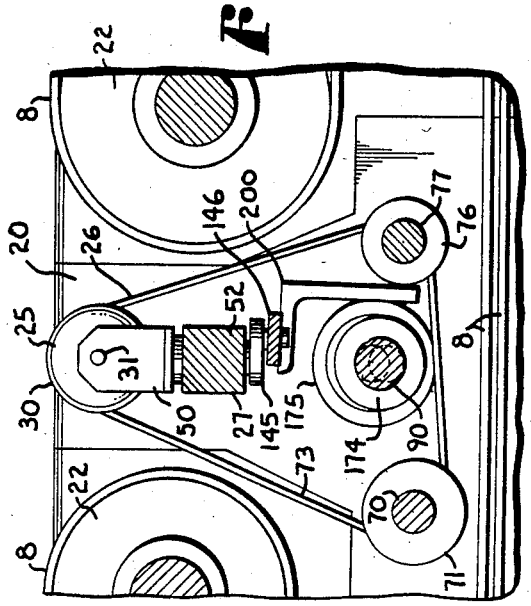

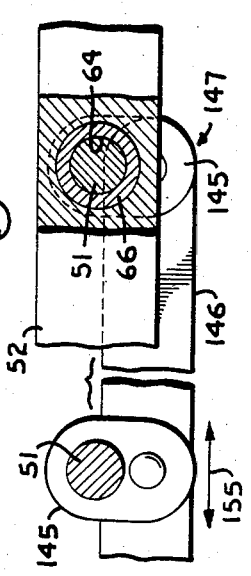
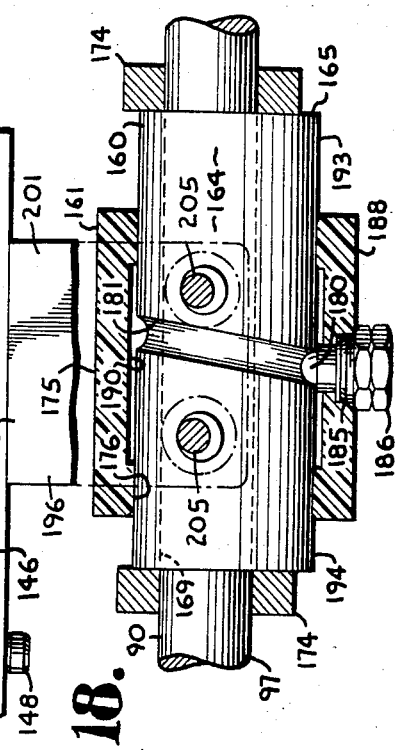
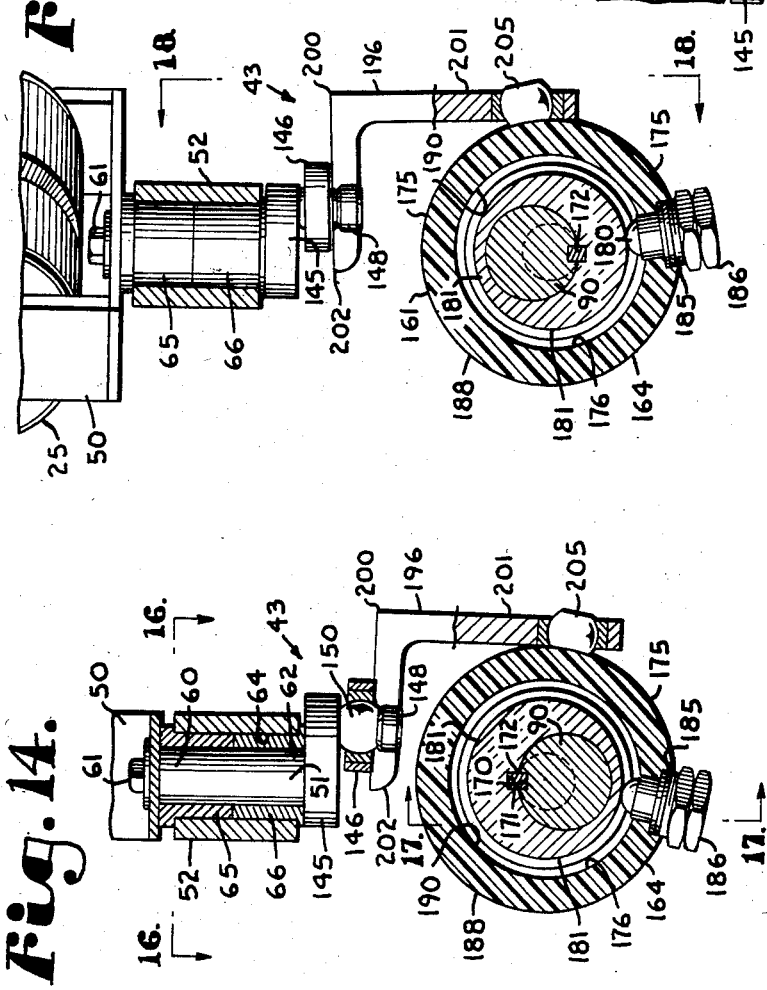
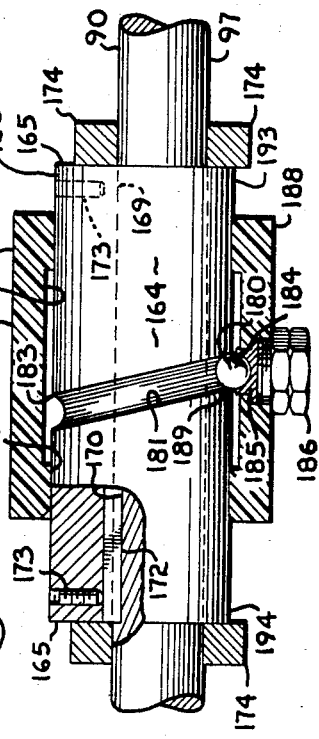

POWERED ROLLER DIVERTER

BACKGROUND OF THE INVENTION

The present invention relates to conveyors, and more specifically, to diverter mechanisms for selectively diverting baggage, such as suitcases, from a first main belt conveyor onto an intersecting conveyor.

A variety of conveyor means having diverter mechanisms for transferring articles from a first main conveyor onto an intersecting conveyor have heretofore been developed. In particular, diverter assemblies have been developed for use with the following three types of conveyors: gravity powered conveyors, roller conveyors, and belt conveyors.

With gravity powered conveyors, articles normally move on top of a series of non-powered wheels, similar to roller skate wheels, as they move downhill along the conveyor. In a segment of the main conveyor, the wheels may be mounted on supports in such a manner that movement of the supports causes the wheels to become oriented diagonally with respect to the flow path of the main conveyor. When this occurs, an article moving along the conveyor will be diverted off toward a side of the main conveyor. If an intersecting conveyor is located appropriately, the article will be diverted thereto.

In a variation on this type of diverter, the wheels are mounted permanently angled with respect to the flow path of the main conveyor and are recessed below the main conveyor surface and do not engage the articles, when the articles are not intended to be diverted. Then, when diversion is desired, the wheels are raised partially above the surface of the conveyor so that an article traveling down the main conveyor will engage them and will be lifted and diverted to the side.

In a powered roller conveyor, articles rest on top of the rollers and are conveyed as the rollers are rotated by a power source. A powered roller conveyor comprises a plurality of these powered rollers aligned parallel to one another. A diverter for such a conveyor is normally located in a gap where one or more of these rollers have been removed. In most instances, the diverters operate similarly to those above noted for gravity conveyors. Additionally, diverters in which the diverter rollers are themselves powered are known.

In belt conveyors, the articles are transported on an upper surface of a continuous belt, the belt being supported by or driven by powered rollers. Diverter assemblies for belt conveyors present special problems, since something must be done with the belt as it passes the gap in the main conveyor where the diverter assembly is located. Normally, the belt is detoured about that gap by rollers located beneath a conveying level of the main belt conveyor.

One major type of diverter for belt conveyors has diverter rollers which are permanently mounted at an angle to the main conveyor and are supported by a mechanism which raises and lowers them with respect to the level of article movement along the conveyor. When these permanently angled rollers are raised, articles moving along the main belt conveyor will encounter them and be lifted and angled toward an intersecting second conveyor. When they are lowered, they are below the level of article movement and do not engage the articles. Normally, these rollers are powered to impart momentum to the articles as they are driven toward the secondary conveyor.

Numerous problems have been associated with these types of conveyor diverters, particularly when they are used in belt conveyors. While belt conveyors can be very safe and efficient, the large belts are massive and can require constant support and power for their operation. Accordingly, when a gap is made in the main conveyor for the location of a diverter assembly, it is desirable that the space be as small as possible to avoid any extended area over which the belt is not supported and powered. Additionally, since the belt must be diverted about the gap, a shallow depth of diverter assembly is desirable, again, so that the belt is unsupported and unpowered over the smallest possible gap.

Another reason for a small gap is so that when articles conveyed by the belt conveyor are not being diverted, they pass unsupported and unpowered over the smallest area of conveyor possible. Minimizing the size of the gap also reduces the amount of vibrational shock transmitted to the article as it passes the diverter, thus decreasing the likelihood of causing damage to the baggage while at the same time increasing operating speed. Additionally, many bags have projections which can fall into, and become caught in, larger gaps, thereby stopping the conveyor system or damaging the articles. Finally, in baggage conveyors, packages and bags of many different sizes pass over the diverter and a smaller gap accommodates them more efficiently.

In the past, there have been two basic sources of problems with the size of the gap in these types of diverters. First, when the diverter rollers are mounted at an angle, they generate a need for a wider gap, if the rollers are of substantial axial length, since the pivoting causes the rollers to take up more room in the direction of the width of the gap. Rollers of greater axial length, however, are preferred, for efficiency in imparting momentum to the articles and in supporting the articles. Additionally, when the rollers are recessed, when not in use diverting articles, an article moving along the main conveyor must pass completely over the gap, receiving no support from the recessed rollers. This means only larger articles can be conveyed.

In another type of powered diverter, the diverter rollers are mounted at a permanent vertical position slightly above the conveying surface of the main conveyor. When diversion is desired, the rollers are pivoted toward the side. Articles moving along the main conveyor, then, are raised by the diverter rollers and are diverted. A major problem with this type of diverter is that even when diversion is not desired, the articles bump into, and are raised by, the diverter rollers. This imparts unnecessary and sometimes damaging shock to the articles.

In powered conveyors, the diverter rollers of the diverter assembly are preferably raised slightly above the conveying surface of the main conveyor, so that they lift the article slightly, and remove the component of momentum imparted by the main conveyor, as the article is diverted. The diverter rollers are preferably rotationally powered, for efficiency in diverting the articles from their original course. In fact, it has been found that if the surface speed of the diverter rollers is not greater than that of the main conveyor, the pieces of baggage will tend to bunch up, and collide, at the diverter assembly. This is particularly true if the angle of diversion is great; and larger angles of diversion are preferable, since they cause the article to be diverted more rapidly, and over a shorter turn distance, than do small angles.

Two methods of powering diverter rollers are generally available. These are: with power mechanically derived from the main conveyor, and with power mechanically derived from an independent motor. In the past, there have been problems with both of these. In the first, it has often been found that the main conveyor bogs down from the drag placed upon it, either when the diverter rollers are themselves clutched into the system, or when a heavy load is placed upon those diverter rollers and more power is needed to drive them. In the case of the independently powered rollers, while the clutch-in problem may be solved somewhat, the extra power supply may take up valuable space, create economic inefficiencies, and add more moving parts, and therefore higher risk of failure, to an already complex mechanical system.

Finally, a conveyor diverter, for use with airport baggage, must be made particularly durable in order to survive the rigorous continuous use to which it will be put.

OBJECTS OF THE INVENTION

Therefore, the objects of the present invention are: to provide a conveyor diverter assembly especially suited for use in a belt conveyor; to provide such a diverter assembly which takes up a minimal amount of conveyor space so that the size of the gap between supported sections of the belt is relatively small, resulting in relatively higher efficiency, safety, and ease of operation; to provide such a diverter assembly which has a minimal depth so as to ensure a small detour for the conveyor belt and so as to provide ease of installment; to provide such a diverter assembly in which the rollers are continuously powered by the main conveyor, so that power requirements to overcome operational drag are approximately the same on the main conveyor during diverter use as during use without diversion and so that the space requirements, economic inefficiencies, and mechanical difficulties created by an alternate power source are avoided; to provide such an assembly which is characterized by a plurality of elongate diverter rollers which are mounted in the diverter assembly in engagement with a lifting mechanism and a swivel mechanism, the lift mechanism and swivel mechanism being synchronized to swivel the diverter rollers, for diversion of the articles, as the rollers are raised slightly out of the narrow gap to engage and divert baggage moving along the main belt conveyor; to provide such an assembly in which the articles are supported, within the gap, by the diverter rollers, when diversion is not desired and the articles are merely crossing the gap; to provide such a diverter assembly which is relatively easy to deploy and disassemble; to provide such a diverter assembly which is relatively inexpensive to produce; and to provide such a diverter assembly which is easy to manufacture, simple to use, and which is particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A conveyor diverter assembly is provided for diverting articles, such as baggage, moving along a main belt conveyor to an intersecting secondary conveyor, operating at a substantial angle, especially a right-angle, to the main conveyor. The main conveyor includes a main belt and a plurality of rollers supporting the belt and rotatably mounted on a main support structure. The diverter assembly is particularly well adapted for use in baggage conveyors such as those found in airports. The assembly includes a frame, a plurality of diverter rollers mounted therein, drive means, lift and swivel mechanisms, and actuator means.

A single row of diverter rollers is mounted within the assembly frame with the diverter rollers oriented coaxially to one another to minimize horizontal width. The frame is oriented in a gap between two separated, basically planar, sections of the main belt and between two rollers supporting the main belt, with the diverter rollers oriented parallel to the belt rollers. The main belt is routed around the diverter assembly so as to be continuous with the main belt planar sections being on opposite sides of the gap.

The drive means continuously powers the diverter rollers, regardless of whether or not the diverter assembly is in use diverting articles from the main conveyor. Preferably, power for the drive means is mechanically derived from the main belt conveyor. Since the diverter rollers are continuously driven, major load fluctuations in the main conveyor are avoided. However, brief load fluctuations may result when the rollers are vertically moved and pivoted.

When the diverter assembly is not being used to divert articles from the main belt, the uppermost surfaces of the diverter rollers are substantially level with the belt surface of the main belt on either side of the gap so that articles of baggage passing along the main conveyor encounter the diverter rollers, are supported thereby, and have momentum imparted to them by the diverter rollers, thus passing them across the gap so that they can continue moving along the main belt conveyor. This arrangement allows the conveyor to accommodate packages which would otherwise be sufficiently small to fall into the gap between the main belt sections.

When diversion of the articles is desired, the diverter rollers are simultaneously raised and pivoted within the diverter assembly. Since they are raised, the diverter rollers will engage articles moving along the main belt conveyor and lift them slightly, helping to remove some of their component of momentum in the direction of the main conveyor. The pivoting orients the diverter rollers to each rotate about an axis positioned at an acute angle relative to the direction of movement of the belt in order to turn the articles toward the intersecting conveyor. The rotation of the diverter rollers then imparts momentum to the articles in the direction of the secondary conveyor, thus diverting the articles.

The actuator means provides for selective operation of the diverter so that the diverter rollers are selectively raised or lowered as necessary. It is foreseen that an electrical switch operated by an attendant, a computer or an electric eye may be utilized to actuate the diverter, however, it is readily seen that other means may be used.

Both the lift mechanism and swivel mechanism are powered by a single eccentric crankshaft. For the lift mechanism, the diverter rollers are mounted upon a vertically mobile bar which is positioned in the diverter assembly in an orientation substantially parallel to the belt rollers of the main conveyor. A crank arm on the crankshaft engages the bar and raises and lowers it as the crankshaft rotates. A clutch/brake controls the rotational motion of the crankshaft.

The swivel mechanism is controlled by the same eccentric crankshaft as the lift mechanism. An eccentric cam is mounted on the eccentric shaft and the cam and shaft are oriented with respect to one another to negate the eccentricity of rotation of the cam. That is, were the cam itself not eccentric, when the eccentric shaft rotates the cam would oscillate between upper and lower positions. A yoke-collar is mounted on the cam and engages same with means providing horizontal oscillation of the collar whenever the shaft and cam rotate. The diverter rollers are mounted upon a linkage system actuated by the horizontal movement of the yoke-collar. The linkage system is a parallelogram system having links and an actuator bar. The links have two extreme orientations. In the first, the diverter rollers are aligned coaxially; in the second, the diverter rollers are angled toward the secondary conveyor and their axles are oriented substantially parallel to one another. Actuation of the linkage system is synchronized with the lift mechanism, by the yoke-collar and cam assembly, so that when the diverter rollers are lowered, they are mounted coaxially, and so that when the diverter rollers are raised, they are angled toward the secondary conveyor.

The structure and interaction of the lift mechanism and swivel mechanism allow the diverter assembly to take up only a relatively narrow space in the main belt conveyor, since whenever the diverter rollers are recessed they are generally closely spaced and coaxial thereby taking up a minimal amount of horizontal space between the opposite belt sections. As will be seen from the drawings and the detailed description, however, when the diverter rollers are raised, more space is available and a high angle of pivoting is facilitated. Additionally, since the diverter rollers are not pivoted until they are raised, they need not be recessed below the level of the main conveyor when diversion is not desired.

The drawings constitute a part of this specification and include exemplary embodiments of the present invention and illustrate various objects and features thereof.

BRIEF DESCRIPTION OF THE DRAWINGS

FIG. 9 is an enlarged, top, and fragmentary plan view of the diverter assembly in the first mode of operation, with portions broken away to show detail thereof.

FIG. 10 is an enlarged, top, and fragmentary plan view of the diverter assembly in the second mode of operation with portions broken away to show details thereof.

FIG. 11 is an enlarged, side elevational view of the main conveyor and the diverter assembly, showing the diverter assembly in the first mode of operation and generally taken along line 11—11 of FIG. 9.

FIG. 12 is an enlarged and fragmentary cross-sectional view of the diverter assembly with portions broken away to show detail thereof.

FIG. 13 is an enlarged and fragmentary top plan view of the diverter assembly with portions broken away to show detail thereof, taken along line 13—13 of FIG. 7.

FIG. 14 is an enlarged fragmentary, and side cross-sectional view of the diverter assembly shown in a first mode of operation, taken along line 14—14 of FIG. 5.

FIG. 15 is an enlarged, fragmentary, and side cross-sectional view of the assembly shown in the second mode of operation correspondingly taken along the same line 14—14 as was FIG. 14.

FIG. 16 is an enlarged, fragementary, top cross-sectional view of the diverter assembly shown in the first mode of operation, taken along line 16—16 of FIG. 14.

FIG. 17 is an enlarged, fragmentary, and side cross-sectional view of a portion of the diverter assembly shown in the first mode of operation taken generally along line 17—17 of FIG. 14.

FIG. 18 is an enlarged fragmentary, and side cross-sectional view of a portion of the diverter assembly shown in the second mode of operation and taken generally along line 18—18 of FIG. 15.

DETAILED DESCRIPTION OF THE PREFERRED EMBODIMENT

Figure 2:
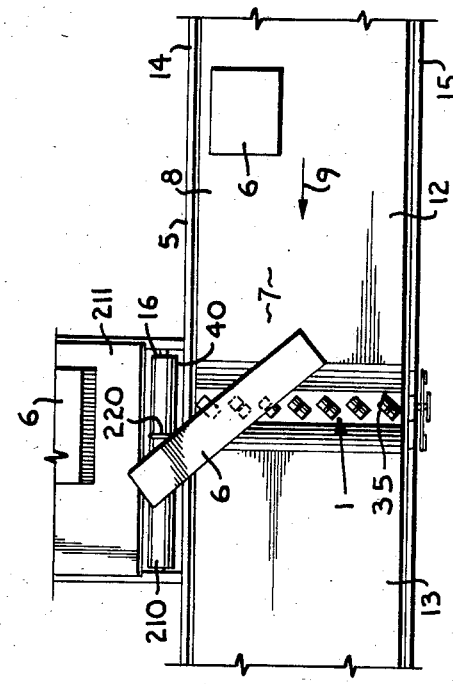
FIG. 2 is a top plan view of the diverter assembly, main conveyor and secondary conveyor; the diverter assembly is shown in a second mode of operation in which articles are being diverted to the secondary conveyor.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a powered roller diverter according to the present invention.

Figure 1:
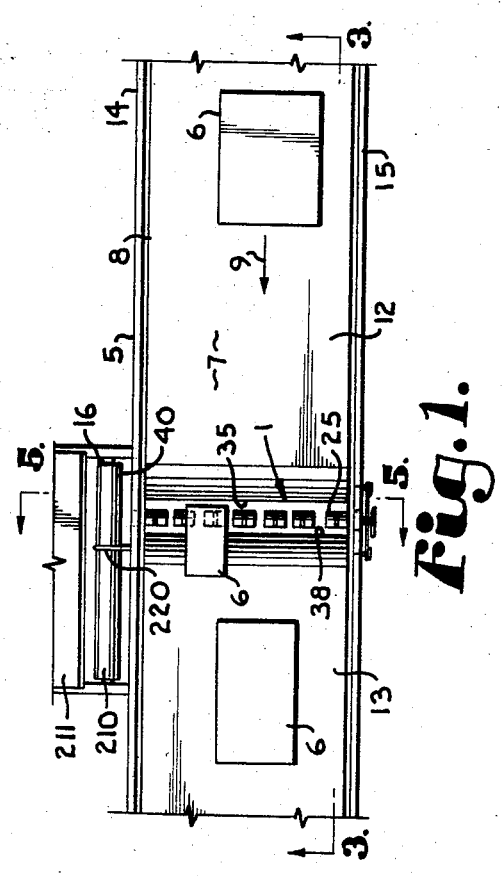
FIG. 1 is a top plan view of a diverter assembly according to the present invention utilized shown in combination with a main and a secondary conveyor; the diverter assembly is shown in a first mode of operation in which articles pass over the diverter assembly and continue to move along the main conveyor.

In FIGS. 1 and 2, the diverter 1 is shown in use in a main belt conveyor 5, as may be found transporting articles, such as baggage 6, in airports or the like. In FIG. 1, the diverter 1 is shown in a first position and in a first mode of operation. In this first mode of operation, baggage 6 is shown being transported on an upper surface 7 of a belt 8 of the main conveyor 5. In this example, direction of conveyance by the main conveyor 5 is shown by arrow 9. When the diverter 1 is in this first mode of operation, baggage 6 is not diverted, but rather passes over the diverter 1, in movement from an upstream side 12 of the main conveyor 5 to a downstream side 13. The two sides 12 and 13 of the main conveyor 5 are generally coplanar.

In FIG. 2, the diverter 1 is shown in a second position, or a second mode of operation. In this mode of operation, baggage 6, moving along the upstream side 12 of the main conveyor 5, in the direction of arrow 9, engages the diverter 1 and is diverted thereby to a secondary conveyor 16 for diversion to a remote location, not shown. In this manner, baggage 6 moving along a main conveyor 5 can be selectively diverted by the diverter assembly 1 to various locations.

The main conveyor 5 includes side rails 14 and 15 which prevent the baggage 6 from moving off the main conveyor 5 except during diversion. It has been found to be preferable that baggage 6, moving along the main conveyor 5, which is to be diverted, be positioned near the guard rail 14 on the side of the conveyor 5 toward which the diversion will take place. This positioning may be accomplished by diverters, not shown, positioned further upstream.

Figure 3:
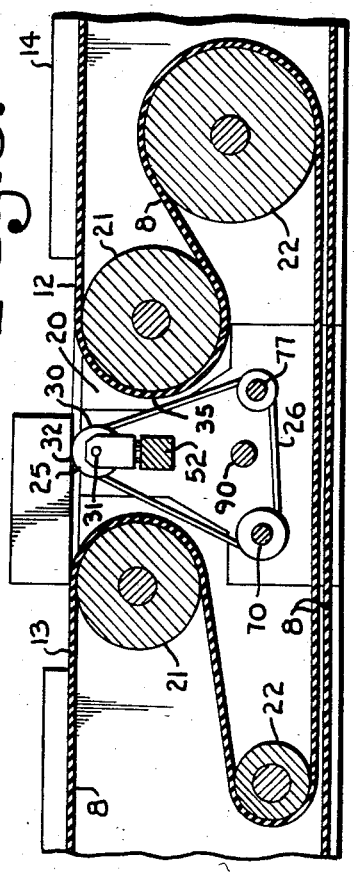
FIG. 3 is an enlarged cross-sectional view of the main conveyor and the diverter assembly, showing the diverter assembly in the first mode of operation and taken along line 3—3 in FIG. 1.

As shown in FIG. 3, the diverter assembly 1 is positioned in a gap 20 in the main conveyor 5. The gap 20 is a space between the upstream and downstream sides 12 and 13, of the main conveyor 5, about which the belt 8 is detoured. The belt 8 is detoured about the gap 20 by rollers 21 and 22 located in the main conveyor 5. Thus, the belt 8 moves continuously from the upstream side 12 to the downstream side 13 of the main conveyor 5. The main conveyor 5, then has two, generally coplanar, conveying surfaces, one upstream 12 and one downstream 13.

Referring to FIG. 11, the diverter assembly 1 includes a diverter roller 25, a drive mechanism 26, for rotating the diverter roller 25, and a support mechanism 27 for properly positioning the diverter roller 25 in the gap 20 in the main conveyor 5. In the illustrated embodiment the assembly 1 includes seven substantially identical diverter rollers 25; however, it is readily seen that various numbers of diverter rollers 25 may be utilized with the present invention depending on size of the articles being diverted, belt width, etc. It is preferred that the rollers 25 have a substantial axial length, here approximately 4 inches, so that a typical baggage conveyor 5 will not require more than about seven rollers 25, and so that each roller 25 can effectively help support the articles and convey momentum thereto.

Each diverter roller 25 includes a roller surface 30 and an axle 31, FIG. 3. According to the present invention, each diverter roller 25 is constantly rotated by the drive mechanism 26 so that the roller surface 30 continuously moves in the general direction 9 of the belt 8 in the main conveyor 5. In the first mode of operation, shown in FIGS. 1 and 3, the diverter rollers 25 are supported such that the uppermost portion 32 of each of the roller surfaces 30 is substantially level, or coplanar, with the upper surface 7 of the main conveyor belt 8 on opposite sides of the gap 20. Additionally, in this first mode, the axles 31 of the rollers 25 are aligned substantially perpendicular to the direction of motion 9 of the main conveyor 5. Thus, articles 6 moving along the main conveyor 5 will encounter the gap 20 when they reach the end 35 of the upstream side 12. Shortly beyond that point, the articles 6 will encounter the uppermost part 32 of roller surfaces 30 and the rotating action of the rollers 25 will tend to move the articles 6 across the gap 20. After moving across the gap 20, the articles 6 will encounter an end 38 of the downstream side 13 of the main conveyor 5, will re-engage the belt 8, and will continue to be transported along the main conveyor 5. Since the uppermost portion 32 of the rollers 25 is substantially co-planar with both sides 12 and 13 of the main conveyor 5, in the first mode articles do not dip into the gap 20 significantly. Preferably, the roller surfaces 30 are formed from a material, such as rubber or synthetic rubber, having a high coefficient of friction, to facilitate engagement with the articles 6.

As will become evident from the disclosure, the surface speed of the roller surfaces 30 may be varied, however, it has been found that a surface speed somewhat faster than the surface speed of the belt 8 of the main conveyor 5 is preferred in order to avoid congestion in the main conveyor 5 at the gap 20. Experiments have shown that a surface speed for the rollers 25 of about 5% faster than the surface speed of the belt 8 is preferred.

Figure 4:
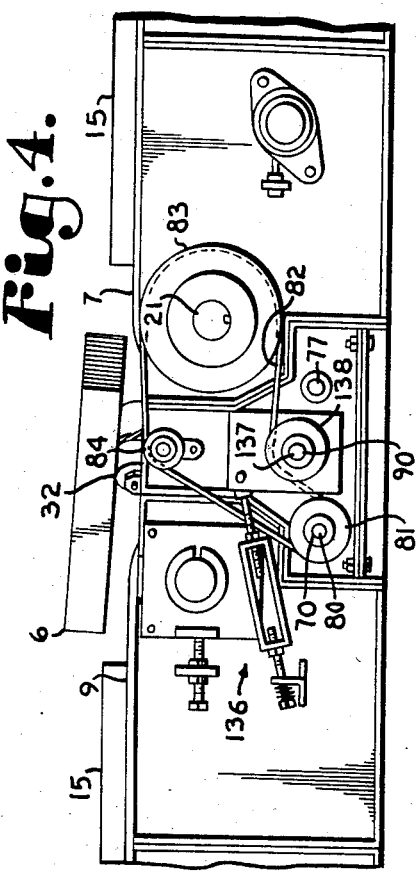
FIG. 4 is an enlarged side elevational view of the main conveyor and the diverter assembly, showing the diverter assembly in the second mode of operation.

In the second mode of operation, shown in FIGS. 2 and 4, the uppermost part 32 of each roller surface 30 is raised above the upper surface 7 of the main belt 8 and the axle 31 of each roller 25 is pivoted toward the secondary conveyor 16. To be pivoted toward the secondary conveyor 16 means angled such that the rotational motion of the roller surface 30 will impart momentum to the articles 6 in a manner driving the articles 6 substantially toward the secondary conveyor 16. In the second mode of operation, when an article 6 has reached the end 35 of the upstream side 12 of the main conveyor 5, it will engage the diverter rollers 25 and will be lifted and turned somewhat thereby. It has been found that a total lift of about 0.5 inches is preferred. The rotating motion of the roller surfaces 30 will tend to drive the articles 6 toward the secondary conveyor 16. When the articles 6 engage the lead end 40 of the secondary conveyor 16, they will tend to be pulled onto the secondary conveyor 16 and diversion is complete. Generally, diversion of this type has the effect of rotating the articles 6 through a ninety-degree angle as well as changing their direction of travel. It has been found that diversion is most efficient if the secondary conveyor 16 further lifts the articles 6 an additional 0.5 inches.

Following the desired diversion, the rollers 25 are then lowered and pivoted back into the original position shown in FIG. 1. The vertical and pivotal motions of the diverter rollers are controlled by a lift mechanism 42 and a swivel mechanism 43 detailed below.

Figure 5:
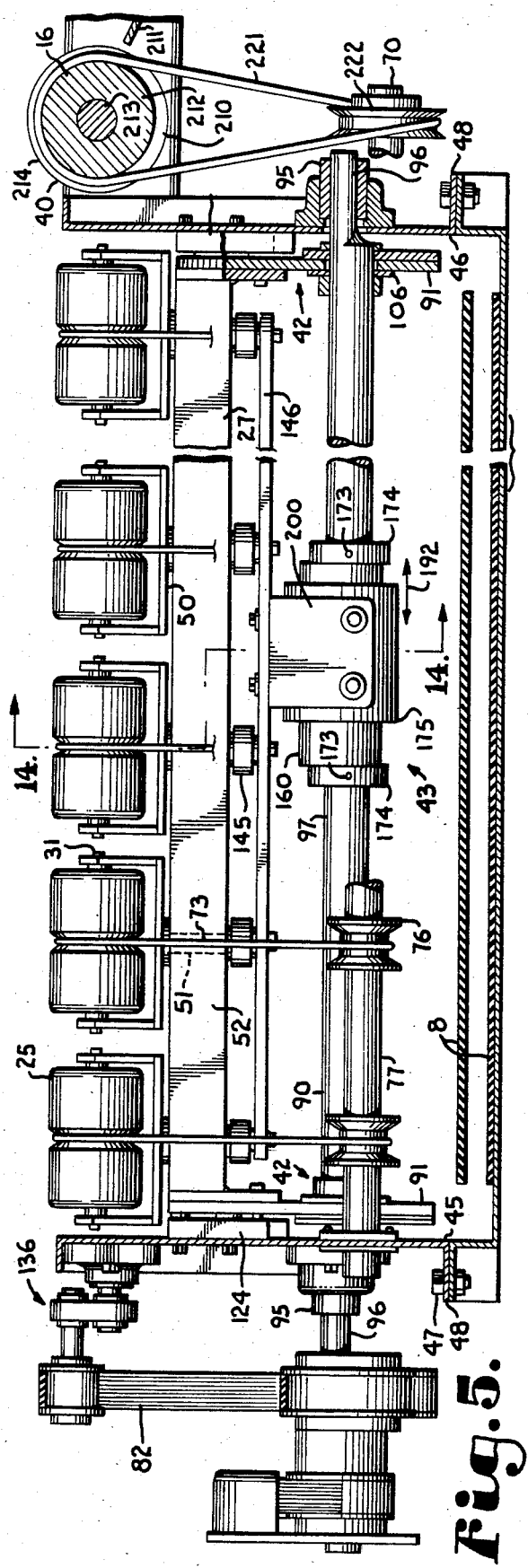
FIG. 5 is an enlarged fragmentary side elevational view of the main conveyor and the diverter assembly, showing the diverter assembly in the first mode of operation and taken generally along line 5—5 of FIG. 1.
Figure 8:
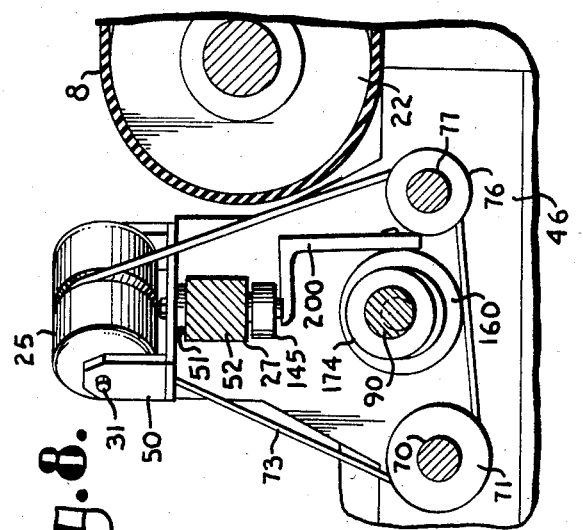
FIG. 8 is an enlarged, fragmentary, and transverse cross-sectional view of the main conveyor and the diverter assembly in the second mode of operation, taken along line 8—8 of FIG. 10.

Referring to FIG. 5, the diverter assembly 1 comprises first and second upright end frame members 45 and 46 respectively, with the bulk of the diverter assembly 1 suspended therebetween. The assembly 1 may be mounted within a main conveyor 5 by means such as bolts 47 and end flanges 48 on the frame members 45 and 46.

Support of the diverter rollers 25 within the assembly 1 is as follows: Each diverter roller 25 is rotatably supported by an associated axle 31 in a clevis or fork 50. Each fork 50 is mounted on a post 51 pivotally supported in the assembly 1 by an elongate, longitudinal bar 52. The longitudinal bar 52 is horizontally and transversely supported within the assembly 1 by the lift mechanism 42 detailed below. As shown in FIG. 11, the illustrated bar 52 is of generally rectangular cross section.

Referring to FIG. 14, each post 51 has an upper end 60 attached to the fork 50, as by a bolt 61, and a lower end 62 which engages the swivel mechanism 43, detailed below. Each post 51 extends through a bore 64 extending vertically through the bar 52. Rotational motion of the post 51 and fork 50, to accommodate movement between the two modes of operation of the assembly 1, is facilitated by flange bearings 65 and 66 positioned around the post 51. As is evident from FIGS. 11 and 14, as the bar 52 is vertically raised or lowered within the assembly 1, the diverter rollers 25 undergo analogous movement. The lift mechanism 42 which facilitates this motion is detailed below.

As described above, each diverter roller 25 is continuously rotated by the drive mechanism 26. Referring to FIGS. 9 and 11, the drive mechanism 26 comprises a drive shaft 70, pulley 71 and belt 73 arrangement. Each roller 25 includes a circumferential groove 75 approximately half way between opposite ends of each roller 25 through which the belt 73 passes. Each belt 73 is continuous and simultaneously wraps about an associated pulley 71 affixed to the drive shaft 70, an associated roller 25 and an associated idler 76 rotatably mounted on an idler axle or shaft 77. The pulleys 71 are fixedly attached to the shaft 70, so as to rotate coaxially therewith, and positioned such that associated pulleys 71, roller grooves 75 and idlers 76 are generally in a coplanar alignment when in the first mode of operation. As the drive shaft 70 is rotated, the movement of the belt 73 through the groove 75 rotates and drives the rollers 25. Preferably, the belt 73 is composed of a stretchable material having a high coefficient of friction in order to ensure efficient transfer of motion to the rollers 25 and to accommodate the lifting and turning of the rollers 25 which occur during the second mode of operation, shown in FIG. 10. The idler pulleys 76 are preferably horizontally slidable along the idler axle 77 to accommodate movement of the belt 73 during operation.

While the drive shaft 70 may be rotated by a variety of means, it is preferred that the power for the drive shaft be derived from the main conveyor 5 so that space may be conserved and efficiency maintained. In FIG. 4, such a power mechanism is detailed. One end 80 of the drive shaft 70 has fixedly attached thereto a drive gear 81 so as to generally coaxially rotate therewith. The gear 81 engages a belt 82 which is reeved about and driven by, a second gear 83 fixedly attached to an appropriate end of one of the rollers 21 of the main conveyor 5. Gear 84 serves as an idler and is adjustable to maintain appropriate tension in the belt 82. Thus, as the main conveyor 5 is operated, with the concomitant rotation of the rollers 21, the pulley drive shaft 70 is continually rotated and the diverter rollers 25 are continuously driven. Appropriate gear diameter ratios may be chosen to drive the diverter rollers 25 with the desired surface speed relative to the surface speed of the belt 8.

The lift mechanism 42, as seen in FIG. 5, which controls and actuates the lifting of the bar 52 in the assembly 1 in order to raise and lower the diverter rollers 25 between the two modes of operation, is an elongate shaft 90 having an eccentrically rotating section through a portion thereof and a crank arm 91 arrangement as follows:

The shaft 90 extends between bearings 95 positioned in the upright end frames 45 and 46. The shaft 90 has two end portions 96 and a central portion 97. The end portions 96 are of circular cross section while the central portion 97 is eccentrically aligned relative to an axis of rotation of the circular end portions 96. The shaft 90 is supported in the bearings 95 by the end portions 96 and the shaft 90 rotates about an axis passing through the centers of the end portions 96. The central portion 97 is also of circular cross section, FIG. 7, but is of a larger diameter than the end portions 96. Additionally, an axis defining the center of the central portion 97 is parallel to, but non-colinear with, the axis of rotation of the eccentric shaft 90. Therefore, rotation of the eccentric shaft 90 within the bearings 95 causes the central portion 97 to periodically oscillate within the assembly 1. A suitable maximum total vertical movement of a point on the surface of the central portion 97 during rotation for a particular embodiment of the assembly 1 was found to be about one-half inch. In particular, the diameter of the central portion 97 was one-quarter inch larger than the diameter of the end portions 96. In the embodiment shown, the central portion 97 extends for a length substantially equivalent to, or slightly larger than, the length of the bar 52.

The bar 52 is mounted on the eccentric shaft 90 by means of two crank arms 91. Each crank arm 91 is associated with an end of the longitudinal bar 52 and an end of the central portion 97.

Figure 7:
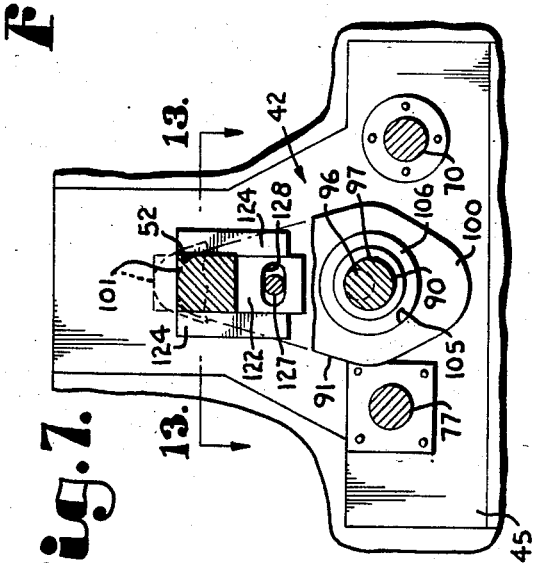
FIG. 7 is an enlarged, fragmentary, and transverse cross-sectional view of the diverter assembly taken along line 7—7 of FIG. 6.
Figure 6:
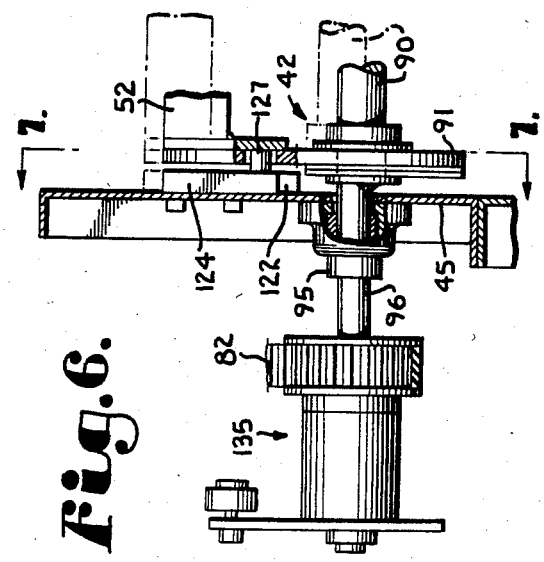
FIG. 6 is an enlarged top fragmentary plan view of the diverter assembly with portions broken away to show internal detail.

Referring to FIG. 7, each crank arm 91 has a lower broad portion 100 and an upper narrow portion 101. The crank arms 91 are preferably made from a relatively thin, light but strong, substance so that they do not take up appreciable space. The lower portion 100 has a large circular aperture 105 therein. The aperture 105 is lined by a bushing or bearing 106 to rotatably receive the central portion 97 of the eccentric shaft 90 therethrough. When the crank arm 91 is supported in the vertical position shown in FIG. 7, then rotation of the eccentric shaft 90 results in an oscillation of the crank arm 91 in a manner thrusting the upper end 101 of the crank arm 91 into, and out of, the position shown in phantom lines in FIG. 7.

Support of the bar 52 within the assembly 1, and its interaction with the crank arms 91, are detailed in FIG. 12. Attached to each end of the bar 52, as by welding or the like, is a straight bracket 114. The bracket 114 and longitudinal bar 52 include an upper bore 115 having a threaded interior for receipt of a bolt 116. The crank arm 91 includes an upper aperture 119 therein which is aligned with the aperture 115 in the bracket 114.

The bolt 116 has an outer end 120 which secures the bar 52 to a block 122. The block 122 is slidably received within two spaced end supports 124 defining a vertical track 125 as seen in FIG. 13. The end supports 124 permit the block 122 to slide vertically within the track 125 but they prohibit lateral motion. Thus, as the eccentric shaft 90 rotates, the crank arm 91 moves through the upper and lower positions thereof and, since the crank arm 91 is connected to the bar 52, ultimately by the bolt 116 as defined below, the bar 52 raises and lowers within the assembly 1, with lateral motion controlled by the supports 124. Proper orientation of the bar 52 is assured by a second bolt 127 which connects the straight bracket 114 to the block 122. Where bolt 127 passes through the crank arm 91, a slot 128, FIG. 7, is provided. The slot 128 permits the bracket 114 and block 122 arrangement to tolerate the horizontal motion of the lower portion 100 of the crank arm 91 as the shaft 90 rotates.

Where the bolt 116 engages the crank arm 91, a ball joint 130 and bushing 131 are provided to accommodate relative rotational movement of the bolt 116 and crank arm 91 and to allow the bolt 116 to be tightened without squeezing the bracket 114 and block 122 together. A second bushing 132 surrounds the lower bolt 127 to allow the bolt 127 to be tightened down into threads 133 in an aperture 134 in the bracket 114.

The two crank arms 91 are synchronized, to simultaneously lift both ends of the longitudinal bar 52 and maintain the longitudinal bar 52 in a constantly horizontal position. The lift mechanism 42 shown, then, operates on a 360° cycle with maximum and minimum positions occurring between 180° rotations of the eccentric shaft 90. A clutch and brake arrangement 135 including alignment adjustment apparatus 136 permits control of rotation of the eccentric shaft 90 and, when associated with appropriate actuation means (not shown), the bar 52 may be selectively maintained in the lower position, see FIG. 3, the upper position, see FIG. 4, or selectively moved therebetween. A variety of clutch and brake means 135 may be employed with the present invention. Since they are well-known to those skilled in this art, they will not be detailed herein. Two important features, however, bear mention. First, the clutch and brake should operate on a 180° rotation cycle so that the lift mechanism 42 will be properly actuated. Secondly, the brake should operate to retain the bar 52 in the raised position, FIG. 4, during the second mode, so that the bar 52 does not slip back to the lower position, FIG. 2, until intended.

It is preferred, in order to conserve space and increase efficiency, to have the rotational motion of the eccentric shaft 90 powered by the main conveyor 5. Such an arrangement is shown in FIG. 4. One end 137 of the eccentric shaft 90 includes a gear 138 mounted thereon. The drive belt 82 engages the gear 138 and constantly rotates it, with power derived from the roller 21 of the main conveyor. The clutch and brake system 135 are selectively used to convert the rotational motion of the gear 137 into a drive for the eccentric shaft 90 when rotation is desired.

As stated above, whenever the diverter rollers 25 are raised in the assembly 1, by the bar 52, the rollers 25 are also pivoted toward the secondary conveyor 16. It has been found that a pivoting angle of 40° is preferred for achieving the desired diversion, although other angles may prove beneficial. The swivel mechanism 43 which controls the pivoting of the diverter rollers 25 is as follows:

Referring to FIGS. 14 through 16, each post 51 upon which a diverter roller 25 is mounted, by means of fork 50, is securely fastened to a link 145. Each link 145 is connected to a link actuator arm 146, to form a parallelogram linkage system 147. The engagement between each link 145 and the actuator arm 146 is pivotable, and, as shown in FIG. 14, is accommodated by a press fit ball joint 150 engaging the link actuator arm 146 and the link 145 and held in position by a bolt or rivet 148. Horizontal movement of the actuator arm 146 in the directions shown by a double-headed arrow 155, in FIG. 16, will then pivot each post 51 synchronously. Accordingly, the posts 51 are non-rotatably mounted, as by welding, on the links 145. The length of the links 145 can be selected by calculations known to one of ordinary skill in the art, to permit the desired angle of pivoting, in this case 40°, to be accommodated by a desired amount of horizontal motion of the actuator arm 146. It is easily seen then, that if the horizontal motion of the actuator arm 146 is appropriately synchronized with the vertical motion of the longitudinal bar 52, then the diverter rollers 25 can be pivoted at the same time they, are lifted. This synchronization is facilitated by a longitudinal drive means comprising, in part, the portion of the swivel mechanism 43 detailed below:

The term "longitudinal drive means" refers to a portion of the swivel mechanism acting longitudinally, or horizontally, with respect to the eccentric shaft 90. Referring to FIG. 17, the desired horizontal motion is actuated by operation of a cam 160 and collar 161 arrangement mounted on the central portion 97 of the eccentric shaft 90. The cam 160 is formed from a cylindrical or annular piece of suitable material, such as steel, and has a cylindrical outer surface 164 and two circular ends 165. The cam 160 has a longitudinal bore 169 passing therethrough. The bore 169 is generally circular in cross section and has a diameter sufficiently large to snugly accommodate the central portion 97 of the shaft 90 passing therethrough. Additionally, the bore 169 includes a channel 170 which is utilized to ensure proper orientation of the cam 160 on the shaft 90. The shaft 90 includes a slot 171 therein which is aligned with the channel 170 when the cam 160 is mounted on the shaft 90 FIG. 14. A key 172 engages both the channel 170 and the slot 171 to secure the cam 160 in position. The bore 169 is preferably offset from a central longitudinal axis of the cam 160 a sufficient amount to generally cancel the eccentric rotational motion of the central portion 97 of the eccentric shaft 90. By cancel, it is meant that the overall rotational axis of the cam 160, when the eccentric shaft 90 rotates, is colinear with a central longitudinal axis of the cam 160. As a result of this cancellation, any point on the cylindrical surface 164 of the cam 160 substantially defines a circle as the cam 160 rotates. Thus, the collar 161 does not move up and down when the cam 160 is rotated.

Proper rotational alignment between the cam 160 and the eccentric shaft 90 is critical to ensuring that substantially all eccentricity of rotation is removed for any point on the surface 164 of the cam 160. This alignment is secured by the key 172 and slot 171 and channel 170 arrangement described above. Retention of the key 172 in position is accomplished by set screws 173. The longitudinal position of the cam 160 upon the shaft 90 is further secured by locking rings 174 positioned around the shaft 90 and against the ends 165 of the cam 160. As shown in FIG. 5, the position of the collars 171 may be secured by set screws 173. It is readily seen, however, that a variety of methods of securing the cam 160 to the eccentric shaft 90 can be employed.

The yoke collar 161 is a cylindrical sleeve 175 having a longitudinal bore 176 extending therethrough. The sleeve 175 is slidably received about the cam 160, with the engagement between the sleeve 175 and the cam 160 being snug, but also such that the cam 160 can rotate within the sleeve 175.

Horizontal motion of the link actuator arm 146 is facilitated by horizontal oscillation of the sleeve 175 on the cam 160. The horizontal oscillation is controlled by a ball 180 and groove 181 arrangement as shown in FIGS. 17 and 18. The groove 181 extends, obliquely, about the outer surface 164 of the cam 160, with the horizontal distance between two extreme points 183 and 184 of the groove 181, located 180° apart from one another on the cam 160, being the desired horizontal distance through which movement of the link actuator arm 146 is intended. The groove 181 is sized to form a track for the ball 180 as the cam 160 rotates. The ball 180 is retained within the groove 181, and in a stationary position relative to the collar 161, by a plug 185 and pressure bolt 186 located within a threaded aperture 187 in the cylindrical wall 188 of the collar 161. The pressure bolt 186 is threadably received within the aperture 187 and, upon tightening, pushes the plug 185 against the ball 180. The plug 180 includes a curved end 189 which partially receives the ball 180 and holds it in position. Interaction of the ball 180, the plug 185 and the pressure bolt 186, are easily seen to prevent any longitudinal motion of the sleeve 161 with respect to the cam 160, in which the motion is independent of the motion of the ball 180 in the groove 181. In other words, the ball 180 locks the sleeve 175 in place with respect to the cam 160. As the cam 160 rotates, the ball 180 will follow the groove 181 and the collar 161 will follow the ball 180. A recessed portion 190 of the bore 176 helps the sleeve 175 accommodate the ball 180 and groove 181 mechanism. Since the groove 181 is oblique, rotation of the cam 160 causes horizontal oscillation of the sleeve 161 in the directions of the double headed arrow 192 shown in FIG. 5. In FIG. 17, the collar 161 is shown at its maximum horizontal displacement toward end 193 of the cam 160 which corresponds to FIG. 1, with the rollers 25 aligned co-axially. In FIG. 18, the collar 161 is shown at its maximum displacement toward the opposite end 194 of the cam 160, which corresponds to FIG. 2 with the rollers 25 pivoted.

It is now readily seen, then, that if an appropriate connecting mechanism is provided between the collar 161 and the link actuator arm 146, as the shaft 90 rotates the motion of the collar 161 will move the actuator arm 146 to pivot the rollers 25. This connecting mechanism 196 is illustrated in FIGS. 14 and 15. In FIG. 14, the bar 52 is shown in its lowered position and in FIG. 15, the bar 52 is shown in its raised position, with the diverter rollers 25 pivoted for diversion. The connecting mechanism 196 includes an angle bracket 200 extending between the collar 161 and the link actuator arm 146. The angle bracket 200 has a first arm 201 and a second arm 202 which form an angle of generally 90° with one another. The first arm 201 is attached to the collar 161 by two ball joints 205, FIG. 18. The second arm 202 is attached to the link actuator arm 146 by bolts and washers 206.

As is understood by comparing FIGS. 14 and 15, when the bar 52 is lifted, the actuator arm 146 is also lifted, pulling the angle bracket 200 along with it and causing the collar 161 to rotate about the cam 160 slightly. This rotational motion is accommodated by the ball joints 205 at the junction between the angle bracket 200 and the collar 160 and by the ball joints 150 at the junctions between the actuator arm 146 and each of the links 145. It has been found, in the illustrated embodiment, where the outside diameter of the collar 161 is about 3½ inches, that a total upward motion of about one-half inch for the diverter rollers 30 is accommodated by a total rotation of the collar 161 of approximately 18°, although it is noted that the angles and movements are directly related to the orientations and dimensions of the parts utilized.

The swivel mechanism 43 synchronizes the pivoting of the diverter rollers 25 with the lifting of the bar 52 in the following manner:

The swivel mechanism 43 is aligned with the eccentric shaft 90 in such a manner that when the crank arms 91 are completely lowered, FIG. 1, the collar 161 is at an extreme position, FIG. 17, with the actuator arm 146 positioning the links 145 with the diverter rollers 125 aligned coaxially with one another. However, when the crank arms 91 are positioned so that the bar 52 is completely raised, FIG. 2, the collar 161, FIG. 18, has been oscillated to its other extreme horizontal position, moving the actuator arm 146 and completely pivoting the diverter rollers 25, FIG. 15. The upward motion of the diverter rollers 25 is accommodated by the swivel mechanism 43 through the 18° rotation of the collar 161, FIGS. 14 and 15.

It is readily apparent that complete movement of the lift and swivel mechanisms, 42 and 43 respectively, through any two extremes will occur with 180° rotation of the eccentric shaft 90 and can be synchronously controlled by the clutch and clutch brake mechanism 135 discussed above.

Numerous actuation means (not shown) may be utilized, for actuating the clutch and brake 135 as, for example, an electrical switch; the switch being operated by a person, computer or electric eye or sensor.

In the embodiment shown in FIG. 1, the secondary conveyor 16 comprises a spitter roller 210 and a slide 211. Referring to FIG. 5, the spitter roller 210 is a cylindrical roller 212 having a central axis 213 and a roller surface 214. The roller 212 has a groove 220, FIG. 2, therein. The roller 210 is powered by a belt 221 and pulley 222 arrangement as shown in FIG. 5. For efficiency, the pulley 222 is mounted on the drive shaft 70. The continuous belt 221 provides communication between the pulley 222 and the groove 220 for rotational motion to be transferred from the pulley 222 to the roller 210. Preferably, the roller surface 214 is composed of a material having a sufficiently high coefficient of friction to provide for efficient engagement with diverted articles. As shown in FIG. 2, as articles 6 are diverted by the assembly 1, they will engage the spitter roller 210 and be lifted thereby onto the slide 211. Once on the slide 211, the articles 6 will slide downward to their intended desinations.

It is readily seen that numerous types of secondary conveyors 16 may be utilized with the present invention. The spitter roller 210 is particularly suitable for uses where a slide 211 may be used, because the spitter roller 210 may be easily driven by the same power source which drives the diverter assembly 1. It has been found that efficient operation is facilitated if the surface speed for the spitter roller 210 is about 10% faster than that for the diverter rollers 25.

The cooperation between the lift mechanism 42 and the swivel mechanism 43 are seen to offer distinct advantages to this invention. For example, since the rollers 25 are only pivoted when they are raised, FIG. 2, they may be long rollers 25, that is having a relatively long central axis of rotation 31, which would not be easily able to easily pivot to a 40° angle while still recessed within the gap 20. The larger rollers 25 may accommodate articles 6 of varying size better than narrower rollers. Additionally, a smaller gap 20 may be used, increasing the flexibility of the assembly 1 toward installment in numerous conveyor systems and diverting articles 6 of various sizes. Finally, since the rollers 25 engage articles 6 even when diversion is not intended, the vibrational shock transmitted to the articles 6 is probably lessened, and articles 6 which are narrower than the gap 20 may be accommodated.

It is to be understood that while certain forms of the present invention have been illustrated and described herein, it is not to be limited to the specific forms or arrangement of parts described and shown.

What is claimed and desired to be secured by Letters Patent is as follows:

1. A diverter assembly for selectively diverting conveyed articles from a first conveyor to an intersecting second conveyor, said first conveyor having an upstream side with an article conveying surface, a downstream side, with an article conveying surface substantially coplanar with said upstream side article conveying surface, and a gap between said upstream and downstream sides in which said diverter assembly is mounted; said diverter assembly comprising:
   (a) a plurality of diverter rollers positioned in said first conveyor;
      (i) said diverter rollers each having an axle and a roller surface for engaging an article moving along said first conveyor and conveying momentum to said article;
   (b) drive means for rotating said diverter rollers;
      (i) said drive means rotating each of said rollers synchronously;
      (ii) said drive means rotating said diverter rollers whenever the first conveyor is in operation;
   (c) support means for mounting said diverter rollers in said first conveyor, said support means having first and second positions;
      (i) said first position orienting said diverter rollers relative to said first conveyor with said roller axles generally perpendicularly aligned to a path of movement of said articles upon said first conveyor and with an uppermost portion of each of said roller surfaces positioned substantially coplanar with said article conveying surfaces of said first conveyor;
      (ii) said second position orienting said diverter rollers relative to said first conveyor surfaces with said roller surfaces uppermost portions extending partially above said first conveyor to engage and partially lift an article moving along said first conveyor;
   (d) a lift mechanism connected to said support means for selectively motivating said support means between said first and second positions; said lift mechanism including an eccentric crankshaft, at least one crank arm, a clutch and a clutch-brake;
      (i) said clutch and clutch-brake providing selective rotation of said crankshaft;
      (ii) said crank arm being mounted on said crankshaft and connected to said support means so that rotation of said crankshaft periodically moves said support means between said first and said second positions;
      (iii) said clutch-brake selectively stopping said crankshaft rotation when said support means is in a selected position; and
   (e) a swivel mechanism connected to said diverter rollers for pivoting said axles out of said perpendicular alignments whenever said support means is raised by said lift mechanism and for returning said roller axles to said perpendicular alignments whenever said support means is lowered by said lift mechanism; said swivel mechanism including a driveshaft, a yoke-collar, a link mechanism and a link mechanism actuator;
      (i) said link mechanism having said diverter rollers mounted thereon and having normal and diverter positions; said normal position having said diverter rollers mounted substantially coaxially to one another and said axles mounted generally perpendicular to said first conveyor path of article movement; said diverter position having said diverter rollers turned toward said second conveyor with said diverter roller axles substantially parallel to one another; said link mechanism being selectively operable by said link mechanism actuator;
      (ii) said driveshaft being a portion of said eccentric shaft with a cam thereon, said cam being cylindrical, with a cylindrical surface, and having a bore therethrough;
      (iii) a portion of said crankshaft extending through said bore;
      (iv) said cam and said crankshaft cooperating to form said driveshaft so that any point on said cylindrical surface rotates so as to define a circle as said crankshaft and cam rotate;
      (v) said yoke-collar being rotatably and slidably mounted on said cam to periodically move said yoke-collar through substantially horizontal oscillation as said driveshaft rotates; said yoke-collar being a cylindrical sleeve with a bore therethrough; said collar having a portion of said cam extending therethrough, said cam surface having a track therein defining a path circumscribing a portion of said cylindrical surface of said cam and oblique to a circular cross-section of said cam; said collar having a follower mechanism associated therewith for following said cam track and periodically moving said collar through substantially horizontal oscillation as said cam and crankshaft rotate;
      (vi) said yoke-collar being connected to said link mechahism actuator, and said horizontal oscillation thereby actuating said link mechanism to move said diverter rollers between said normal and said diverter positions as said driveshaft rotates; said normal position occuring when said support means is lowered and said diverter position occurring when said support means is raised;
      (vii) said lift mechanism and swivel mechanism synchronously lifting and pivoting said rollers;
      (viii) said clutch permitting driving of said crankshaft and said drive shaft;
   (f) whereby when said support means is in said first position articles on said first conveyor engage said diverter rollers and have momentum transferred to them by said diverter rollers, thus facilitating movement of said articles past said diverter assembly and further along said first conveyor; and
   (g) whereby when said support means is in said second position said diverter rollers engage said articles and lift and divert same toward said second conveyor, while simultaneously conveying momentum to said articles.

2. A diverter assembly for selectively diverting conveyed articles from a first conveyor to an intersecting second conveyor, said first conveyor having an upstream side with an article conveying surface, a downstream side, with an article conveying surface substantially coplanar with said upstream side article conveying surface, and a gap between said upstream and downstream sides in which said diverter assembly is mounted; said diverter assembly comprising:
  (a) a diverter roller positioned in said first conveyor;
    (i) said diverter roller having an axle and a roller surface for engaging an article moving along said first conveyor and conveying momentum to said article;
  (b) drive means for rotating said diverter roller;
    (i) said drive means rotating said diverter roller whenever the first conveyor is in operation;
  (c) support means for mounting said diverter roller in said first conveyor, said support means having first and second positions;
    (i) said first position orienting said diverter roller relative to said first conveyor with said roller axle generally perpendicularly aligned to a path of movement of said articles upon said first conveyor and with an uppermost portion of said roller surface positioned substantially coplanar with said article conveying surfaces of said first conveyor;
    (ii) said second position orienting said diverter roller relative to said first conveyor surfaces with said roller surface uppermost portion extending partially above said first conveyor to engage and partially lift an article moving along said first conveyor;
  (d) a lift mechanism connected to said support means for selectively motivating said support means between said first and second positions; said lift mechanism including an eccentric crankshaft, at least one crank arm, a clutch and a clutch-brake;
    (i) said clutch and clutch-brake providing selective rotation of said crankshaft;
    (ii) said crank arm being mounted on said crankshaft and connected to said support means so that rotation of said crankshaft periodically moves said support means between said first and said second positions;
    (iii) said clutch-brake selectively stopping crankshaft rotation when said support means is in a selected position; and
  (e) a swivel mechanism connected to said diverter roller for pivotin said axle out of said perpendicular alignment whenever said support means is raised by said lift mechanism and for returning said roller axle to said perpendicular position whenever said support means is lowered by said lift mechanism; said swivel mechanism including a driveshaft, a yoke-collar, a link mechanism and a link mechanism actuator;
    (i) said link mechanism having said diverter roller mounted thereon and having normal and diverter positions; said normal position having said diverter roller axle mounted generally perpendicular to said first conveyor path of article movement; said diverter position having said diverter roller turned toward said second conveyor; said link mechanism being selectively operable by said link mechanism actuator;
    (ii) said driveshaft being a portion of said eccentric shaft with a cam thereon, said cam being cylindrical, with a cylindrical surface, and having a bore therethrough;
    (iii) a portion of said crankshaft extending through said bore;
    (iv) said cam and said crankshaft cooperating to form said driveshaft so that any point on said cylindrical surface rotates so as to define a circle as said crankshaft and cam rotate;
    (v) said yoke-collar being rotatably and slidably mounted on said cam to periodically move said yoke-collar through substantially horizontal oscillation as said driveshaft rotates; said yoke-collar being a cylindrical sleeve with a bore therethrough; said collar having a portion of said cam extending therethrough, said cam surface having a track therein defining a path circumscribing a portion of said cylindrical surface of said cam and oblique to a circular cross-section of said cam; said collar having a follower mechanism associated therewith for following said cam track and periodically moving said collar through substantially horizontal oscillation as said cam and crankshaft rotate;
    (vi) said yoke-collar being connected to said link mechanism actuator, and said horizontal oscillation thereby actuating said link mechanism to move said diverter roller between said normal and said diverter positions as said driveshaft rotates; said normal position occuring when said support means is lowered and said diverter position occurring when said support means is raised;
    (vii) said clutch permitting driving of said crankshaft and said driveshaft;
  (f) whereby when said support means is in said first position articles on said first conveyor engage said diverter roller and have momentum transferred to them by said diverter roller, thus facilitating movement of said articles past said diverter assembly and further along said first conveyor; and
  (g) whereby when said support means is in said second position said diverter roller engages said articles and lifts and diverts same toward said second conveyor, while simultaneously conveying momentum to said articles.

3. A diverter assembly for selectively diverting conveyed articles from a first conveyor to an intersecting second conveyor, said first conveyor including a rotating roller and having an upstream side with an article conveying surface, a downstream side with an article conveying surface substantially coplanar with said upstream side article conveying surface, and a gap between said upstream and downstream sides in which said diverter assembly is mounted, said diverter assembly comprising:
  (a) a plurality of continuously rotating diverter rollers positioned in said first conveyor;
    (i) each diverter roller having an axle allowing rotation thereof about an axis and having a roller surface for engaging an article moving along said first conveyor and conveying momentum to said article;
  (b) drive means continuously rotating said diverter rollers;
    (i) said drive means comprising a roller drive shaft, pulley and belt arrangement;
    (ii) said drive means deriving power from said rotating roller in said first conveyor;
  (c) support means for mounting said diverter rollers in said first conveyor; said support means having first and second positions associated therewith and including an elongate bar and a plurality of pivotal post and fork arrangements;
    (i) when said support means is in said first position, said diverter roller axles being aligned perpendicular to a path of movement of said articles upon said first conveyor and said diverter rollers surfaces being positioned substantially level with said article conveying surfaces of said first conveyor;

(ii) when said support means is in said second position, said diverter roller surfaces extending partially above said first conveyor article conveying surfaces to engage and partially lift said articles moving along said first conveyor;

(iii) said bar being vertically slidable, within said assembly, when said support means moves between said first and second positions thereof;

(iv) each of said diverter rollers having one of said post and fork arrangements associated therewith; each post being substantially vertically mounted in said bar and having an upper end and a lower end; each fork being mounted on a post uppet end for support of one of said diverter rollers;

(d) a lift mechanism connected to said support means for selectively motivating said support means between first and second positions thereof; said lift mechanism including an eccentric crankshaft, at least one crank arm, a clutch and a clutch-brake;

(i) said clutch and clutch-brake providing selective rotation of said crankshaft;

(ii) said crank arm being mounted on said crankshaft and being connected to said support means so that rotation of said crankshaft periodically moves said support means between said first and second positions;

(iii) said brake selectively stopping said crankshaft rotation when said support means is in a preferred position;

(e) a swivel mechanism connected to said diverter rollers for pivoting said axles out of said perpendicular alignment, by movement of said posts whenever said support means is raised by said lift mechanism, and for returning said roller axles to said perpendicular alignments whenever said support means is lowered by said lift mechanism; said swivel mechanism including a driveshaft, a yoke-collar, a link mechanism and a link mechanism actuator;

(i) said link mechanism having said posts mounted thereon and having normal and diverter positions; said normal position being wherein said diverter rollers are mounted coaxially relative to one another and said axles perpendicular to said first conveyor path of article movement; said diverter position being wherein said diverter rollers are turned to direct article movement toward said second conveyor with said diverter rollers axles substantially parallel to one another; said link mechanism being selectively operable by said link mechanism actuator;

(ii) said driveshaft comprising a portion of said eccentric crankshaft with a cam thereon; said cam being cylindrical, with a cylindrical outer surface, and having a bore therethrough; a portion of said crankshaft extending through said bore; said cam and crankshaft cooperating so that any point on said cylindrical surface rotates so as to substantially define a circle as said crankshaft and cam rotate;

(iii) said yoke-collar being rotatably and slidably mounted on said cam to periodically move said yoke-collar through substantially horizontal oscillation as said driveshaft rotates; said yoke-collar being a cylindrical sleeve with a bore therethrough; said yoke-collar having a portion of said cam extending therethrough;

(iv) said cam surface having a track therein defining a path circumscribing said cylindrical surface of said cam and oblique to a circular cross-section of said cam;

(v) said collar having a follower mechanism associated therewith for following said cam track and periodically moving said collar through horizontal oscillation as said cam and crankshaft rotate;

(vi) said yoke-collar being connected to said link mechanism actuator, and said horizontal oscillation thereby actuating said link mechanism between said normal and said diverter positions as said driveshaft rotates; said normal position occurring when said support means is lowered and said diverter position occurring when said support means is raised; and (f) said crankshaft being selectively driven by said first conveyer by actuation of said clutch;

(g) whereby when said support means is in said first position articles on said first conveyor engage said diverter rollers and have momentum transferred thereto by said diverter rollers, thus facilitating movement of said articles past said diverter assembly and further along said first conveyor; and (h) whereby when said support means is in said second position said diverter rollers engage said articles and lift and divert same toward said second conveyor while simultaneously conveying momentum to said articles.

4. A diverter assembly, for selectively diverting articles from a first conveyor to an intersecting second conveyor, in operational combination with said first conveyor and said second conveyor; wherein:

(a) said diverter assembly includes a frame, a plurality of diverter rollers, drive means, support means, a lift mechanism, a swivel mechanism and actuator means;

(i) said diverter rollers each having an axle and a roller surface for engaging articles moving along said first conveyor and conveying momentum to said articles;

(ii) said drive means coupling said diverter rollers to said first conveyor and continuously rotating said diverter rollers with power mechanically derived from said first conveyor;

(iii) said support means providing mounting of said diverter rollers in said assembly frame; said support means having first and second positions; said first position mounting said diverter rollers with said axles coaxial and with said support means in a lowered position; said second position having said support means raised and said diverter rollers turned toward said second conveyor and with said roller axles substantially parallel;

(iv) said lift mechanism being in engagement with said support means for selectively motivating same between said first and second positions; said lift mechanism including an eccentric crankshaft, at least one crank arm, a clutch and a clutch-brake; said clutch providing selective rotation of said crankshaft; said crank arm being mounted on said crankshaft and engageable with said support means so that rotation of said crankshaft periodically moves said support means between said first and second positions; said clutch having said clutch-brake associated therewith for selectively stopping said crankshaft rotation when said support means is in a selected position;

(v) said swivel mechanism engaging said diverter rollers for pivoting same out of said coaxial alignment; said swivel mechanism including a link mechanism, a link mechanism actuator, an eccentric cam and a yoke-collar; said link mechanism having said diverter rollers mounted thereon and having normal and diverter positions; said normal position being wherein said diverter rollers are mounted coaxially relative to one another and said diverter position being wherein said diverter rollers are turned and substantially parallel to one another; said cam being mounted on said crankshaft to substantially cancel eccentric rotation for any point on an outer surface of said cam; said yoke-collar being mounted on said cam to periodically move said yoke-collar through horizontal oscillation as said crankshaft rotates; said yoke-collar engaging said link mechanism actuator; and said horizontal oscillation thereby actuating said link mechanism between said normal and said diverter positions as said crankshaft rotates; said normal position occurring when said support means is lowered and said diverter position occurring when said support means is raised;

(vi) said actuator means selectively actuating said lift mechanism and said swivel mechanism;

(b) said first conveyor is a belt conveyor having an article conveying belt, a plurality of conveyor rollers, a diverter assembly gap between opposite coplanar portions of said belt, belt detour means, and an article conveying surface;

(i) said gap being between two of said conveyor rollers and having said diverter assembly frame mounted therein with said diverter rollers oriented with their axles coaxial and parallel said conveyor rollers, and with an uppermost portion of said diverter roller surfaces substantially level with said article conveying surface, when said diverter assembly support means is in said first position;

(ii) said article conveying belt being detoured, by said detour means, at said gap to pass beneath said diverter assembly frame; and (c) said second conveyor is substantially perpendicular to, and intersecting, said first conveyor substantially near said gap;

(i) said diverter assemby being mounted such that when said support means is in said second position said diverter rollers are partially raised above said first conveyor surface and are turned toward said second conveyor to engage articles on said first conveyor and divert them toward said second conveyor.

5. A diverter assembly for selectively diverting conveyed articles from a first conveyor to an intersecting second conveyor, said diverter assembly comprising:

(a) a frame;
(b) a plurality of diverter rollers;
(i) said diverter rollers each having an axle and a roller surface for engaging articles moving along said first conveyor and conveying momentum to said articles;

(c) drive means coupling said diverter rollers to said first conveyor and continuously rotating said diverter rollers with power mechanically derived from said first conveyor;

(d) support means mounting said diverter rollers in said assembly frame; said support means having first and second positions;

(i) said first position mounting said diverter rollers with the axles substantially coaxial and with said support means in a lowered position;

(ii) said second position having said support means raised and said diverter rollers turned toward said second conveyor and with said axles extending substantially parallel to one another;

(e) a lift mechanism; said lift mechanism being in engagement with said support means for selectively motivating same between said first and second positions; said lift mechanism including an eccentric crankshaft, at least one crank arm, a clutch and a clutch-brake;

(i) said clutch providing selective rotation of said crankshaft;

(ii) said crank arm being mounted on said crankshaft and engageable with said support means so that rotation of said crankshaft periodically moves said support means between said first and second positions;

(iii) said clutch having said clutch-brake associated therewith for selectively stopping said crankshaft rotation when said support means is in a selected position;

(f) a swivel mechanism engaging said diverter rollers for pivoting same out of said coaxial alignment; said swivel mechanism including a link mechanism, a link mechanism actuator, an eccentric cam and a yoke-collar;

(i) said link mechanism having said diverter rollers mounted thereon and having normal and diverter positions; said normal position being wherein said diverter rollers are mounted substantially coaxially relative to one another, and said diverter position being wherein said diverter rollers are turned and aligned substantially parallel to one another;

(ii) said cam being mounted on said crankshaft to substantially cancel eccentric rotation for any point on an outer surface of said cam as said cam and crankshaft rotate;

(iii) said yoke-collar being mounted slidably and rotatably on said cam to periodically move said yoke-collar through substantially horizontal oscillation as said crankshaft rotates;

(iv) said yoke-collar engaging said link mechanism actuator, and said yoke-collar horizontal oscillation thereby actuating said link mechanism between said normal and said diverter positions as said crankshaft rotates, said normal position occurring when said support means is lowered and said diverter position occurring when said support means is raised;

(g) actuator means selectively actuating said lift mechanism and said swivel mechanism;

(h) whereby when said support means is in said first position articles on said first conveyor engage said diverter rollers and have momentum transferred to them by said diverter rollers, thus facilitating movement of said articles past said diverter assembly and further along said first conveyor; and (i) whereby when said support means is in said second position said diverter rollers engage said articles and lift and divert same toward said second conveyor, while simultaneously conveying momentum to said articles.

6. A diverter assembly for selectively diverting conveyed articles from a first conveyor to an intersecting second conveyor, said first conveyor having an upstream side with an article conveying surface, a downstream side with an article conveying surface, and a gap between said upstream and downstream sides in which said diverter assembly is mounted; said diverter assembly comprising:

(a) a plurality of diverter rollers positioned in said first conveyor gap:

(b) drive means for rotating said diverter rollers;

(c) support means for mounting said diverter rollers in said first conveyor, said support means having first and second positions;

(i) said first position orienting said diverter rollers relative to said first conveyor to pass articles engaging said rollers across said gap and further along said first conveyor; said first position having an uppermost portion of said rollers oriented substantially coplanar with said article conveying surfaces of said first conveyor;

(ii) said second position orienting said diverter rollers, relative to said first conveyor article conveying surfaces, with said roller uppermost portions extending partially above said first conveyor to engage and partially lift an article moving along said first conveyor;

(d) a lift mechanism for selectively motivating said support means between said first and second positions;

(e) a swivel mechanism for selectively pivoting said diverter rollers to direct an engaged article toward said second conveyor whenever said support means is raised by said lift mechanism, and for returning said rollers to non-diverting orientations whenever said support means is lowered by said lift mechanism; said swivel mechanism including a driveshaft, a yoke-collar, a link mechanism and a link mechanism actuator;

(i) said link mechanism having said diverter rollers mounted thereon and having normal and diverter positions; said normal position having said rollers oriented to pass engaged articles across said gap and further along said first conveyor; said diverter position having said rollers pivoted toward said second conveyor to pass engaged articles toward said second conveyor; said link mechanism being selectively operable by said link mechanism actuator;

(ii) said driveshaft being a portion of an eccentric shaft with a cam mounted thereon; said cam being cylindrical, with a cylindrical surface, and having a bore extending therethrough;

(iii) a portion of said shaft extending through said cam bore, to form said driveshaft with said cam and shaft cooperating so that any point on said cylndrical surface rotates so as to substantially define a circle as said driveshaft rotates;

(iv) said yoke-collar being rotatably and slidably mounted on said cam to periodically move said yoke-collar through substantially horizontal oscillation as said driveshaft rotates;

(v) said link mechanism actuator connecting said yoke-collar to said link mechanism to pivot said link mechanism and selectively move said diverter rollers between said normal and said diverter positions as said yoke-collar oscillates;

(vi) said lift mechanism and swivel mechanism synchronously lifting and pivoting said rollers so that when said support means is in said first position all of said diverter rollers are oriented in said normal positions, and when said support means is in said second position, said diverter rollers are in said diverter positions;

(f) whereby when said support means is in said first position articles on said first conveyor engage said diverter rollers and have momentum transferred to them by said diverter rollers, thus facilitating movement of said articles past said diverter assembly and further along said first conveyor; and (g) whereby when said support means is in said second position said diverter rollers engage said articles and lift and divert same toward said second conveyor, while simultaneously conveying momentum to said articles.

7. A diverter assembly according to claim 6 wherein:

(a) said yoke-collar is a cylindrical sleeve with a bore therethrough; and (b) said yoke-collar has a portion of said cam extending therethrough;

(i) said cam surface having a track therein defining a path circumscribing a portion of said cylindrical surface of said cam and oblique to a circular cross-section of said cam;

(ii) said yoke-collar having a follower mechanism associated therewith for following said cam track and periodically moving said yoke-collar through said substantially horizontal oscillation as said cam and shaft rotate.

8. A diverter assembly for selectively diverting conveyed articles from a first conveyor to an intersecting second conveyor, said first conveyor having an upstream side with an article conveying surface, a downstream side with an article conveying surface, and a gap between said upstream and downstream sides in which said diverter assembly is mounted; said diverter assembly comprising:

(a) a diverter roller positioned in said first conveyor;

(b) drive means for rotating said diverter roller;

(c) support means for mounting said diverter roller in said first conveyor, said support means having first and second positions;

(i) said first position orienting said diverter roller relative to said first conveyor to pass articles engaging said roller across said gap and further along said first conveyor; said first position having an uppermost portion of said roller oriented substantially coplanar with said article conveying surfaces of said first conveyor;

(ii) said second position orienting said diverter roller, relative to said first conveyor article conveying surfaces, with said roller uppermost portion extending partially above said first conveyor to engage and partially lift an article moving along said first conveyor;

(d) a lift mechanism for selectively motivating said support means between said first and second positions;

(e) a swivel mechanism for selectively pivoting said diverter roller to direct an engaged article toward said second conveyor whenever said support means is raised by said lift mechanism, and for returning said roller to a non-diverting orientation whenever said support means is lowered by said lift mechanism; said swivel mechanism including a driveshaft, a yoke-collar, a link mechanism and a link mechanism actuator;

(i) said link mechanism having said diverter roller mounted thereon and having normal and diverter positions; said normal position having said roller oriented to pass engaged articles across said gap and further along said first conveyor; said diverter position having said roller pivoted toward said second conveyor to pass engaged articles toward said second conveyor; said link mechanism being selectively operable by said link mechanism actuator;

(ii) said driveshaft being a portion of an eccentric shaft with a cam mounted thereon; said cam being cylindrical, with a cylindrical surface, and having a bore extending therethrough;

(iii) a portion of said shaft extending through said cam bore, to form said driveshaft with said cam and shaft cooperating so that any point on said cam cylindrical surface rotates so as to substantially define a circle as said driveshaft rotates;

(iv) said yoke-collar being rotatably and sidably mounted on said cam to periodically move said yoke-collar through substantially horizontal oscillation as said driveshaft rotates;

(v) said link mechanism actuator connecting said yoke-collar to said link mechanism to pivot said link mechanism and selectively move said diverter roller between said normal and said diverter positions as said yoke-collar oscillates;

(vi) said lift mechanism and swivel mechanism synchronously lifting and pivoting said roller so that when said support means is in said first position said diverter roller is oriented in said normal position, and when said support means is in said second position, said diverter roller is in said diverter position;

(f) whereby when said support means is in said first position articles on said first conveyor engage said diverter roller and have momentum transferred to them by said diverter roller, thus facilitating movement of said articles past said diverter assembly and further along said first conveyor; and (g) whereby when said support means is in said second position said diverter roller engages said articles and lift and divert same toward said second conveyor, while simultaneously conveying momentum to said articles.

9. A diverter assembly according to claim 8 wherein:

(a) said yoke-collar is a cylindrical sleeve with a bore therethrough; and (b) said yoke-collar has a portion of said cam extending therethrough;

(i) said cam surface having a track therein defining a path circumscribing a portion of said cylindrical surface of said cam and oblique to a circular cross-section of said cam;

(ii) said yoke-collar having a follower mechanism associated therewith for following said cam track and periodically moving said collar through said substantially horizontal oscillation as said cam and shaft rotate.

10. A diverter assembly for selectively diverting conveyed articles from a first conveyor to an intersecting second conveyor, said first conveyor having an upstream side with an article conveying surface, a downstream side with an article conveying surface, and a gap between said upstream and downstream sides in which said diverter assembly is mounted; said diverter assembly comprising:

(a) a frame;

(b) a plurality of diverter rollers positioned by said frame in said first conveyor;

(c) drive means for selectively rotating said diverter rollers;

(d) support means for mounting said diverter rollers in said frame, said support means having first and second positions;

(i) said first position orienting said diverter rollers, relative to said first conveyor, to pass articles engaging said rollers across said gap and further along said first conveyor; said first position having an uppermost portion of said rollers oriented substantially coplanar with said article conveying surfaces of said first conveyor;

(ii) said second position orienting said diverter rollers, relative to said first conveyor article conveying surfaces, with said roller uppermost portions extending partially above said first conveyor to engage and partially lift an article moving along said first conveyor;

(e) a selectively rotatable shaft mounted in said frame; said shaft having an eccentric shaft portion and a non-eccentric driveshaft portion;

(f) a lift mechanism for selectively motivating said support means between said first and second positions;

(i) said motivating of said support means being selectively actuated by said eccentric portion of said shaft as said shaft rotates;

(g) a swivel mechanism for selectively pivoting said diverter rollers to selectively direct an engaged article toward said second conveyor when said support means is raised by said lift mechanism, and for selectively returning said rollers to non-diverting orientations when said support means is lowered by said swivel mechanism; said swivel mechanism including a yoke-collar, a link mechanism and a link mechanism actuator;

(i) said link mechanism having said diverter rollers mounted thereon and having normal and diverter positions; said normal position having said rollers oriented to pass engaged articles across said gap and further along said first conveyor; said diverter position having said rollers pivoted toward said second conveyor to pass engaged articles toward said second conveyor; said link mechanism actuator selectively actuating said link mechanism;

(ii) said yoke-collar being rotatably and slidably mounted on said non-eccentric driveshaft portion of said shaft; said yoke-collar including horizontal oscillation means coupling it to said driveshaft portion to periodically move said yoke-collar through substantially horizontal oscillation as said driveshaft portion rotates;

(iii) said link mechanism actuator connecting said yoke-collar to said link mechanism to pivot same and selectively move said diverter rollers between said normal and said diverter positions;

(iv) said lift mechanism and said swivel mechanism substantially synchronously lifting and pivoting said rollers so that when said support means is in said first position said diverter rollers are oriented in said normal positions, and when said support means is in said second position said diverter rollers are in said diverter positions;

(h) whereby when support means is in said first position articles on said first conveyor engage said diverter rollers and have momentum transferred to them by said diverter rollers, thus facilitating movement of said articles past said diverter assembly and further along said first conveyor; and (i) whereby when said support means is in said second position said diverter rollers engage said articles and lift and divert same toward said second conveyor, while simultaneously conveying momentum to said articles.

11. A diverter assembly according to claim 10 wherein:

(a) said yoke-collar is a cylindrical sleeve with a bore therethrough; and (b) said driveshaft portion of said shaft has a cylindrical surface with a track therein;

(i) said track defining a path circumscribing a portion of said cylindrical surface of said driveshaft portion and oblique to a circular cross-section of said driveshaft portion;

(ii) said yoke-collar having a follower mechanism associated therewith for following said track and periodically moving said yoke-collar through said substantially horizontal oscillation as said shaft rotates.

12. A diverter assembly for selectively diverting conveyed articles from a first conveyor to an intersecting second conveyor, said first conveyor having an upstream side with an article conveying surface, a downstream side with an article conveying surface, and a gap between said upstream and downstream sides in which said diverter assembly is mounted; said diverter assembly comprising:

(a) a frame;

(b) a diverter roller positioned by said frame in said first conveyor;

(c) drive means for selectively rotating said diverter roller;

(d) support means for mounting said diverter roller in said frame, said support means having first and second positions;

(i) said first position orienting said diverter roller, relative to said first conveyor, to pass articles engaging said roller across said gap and further along said first conveyor; said first position having an uppermost portion of said roller oriented substantially coplanar with said article conveying surfaces of said first conveyor;

(ii) said second position orienting said diverter roller, relative to said first conveyor article conveying surfaces, with said roller uppermost portion extending partially above said first conveyor to engage and partially lift an article moving along said first conveyor;

(e) a selectively rotatable shaft mounted in said frame; said shaft having an eccentric shaft portion and a non-eccentric driveshaft portion;

(f) a lift mechanism for selectively motivating said support means between said first and second positions;

(i) said motivating of said support means being selectively actuated by said eccentric portion of said shaft as said shaft rotates;

(g) a swivel mechanism for selectively pivoting said diverter roller to selectively direct an engaged article toward said second conveyor when said support means is raised by said lift mechanism, and for selectively returning said roller to a non-diverting orientation when said support means is lowered by said swivel mechanism; said swivel mechanism including a yoke-collar, a link mechanism and a link mechanism actuator;

(i) said link mechanism having said diverter roller mounted thereon and having normal and diverter positions; said normal position having said roller oriented to pass engaged articles across said gap and further along said first conveyor; said diverter position having said roller pivoted toward said second conveyor to pass engaged articles toward said second conveyor; said link mechanism actuator selectively actuating said link mechanism;

(ii) said yoke-collar being rotatably and slidably mounted on said non-eccentric driveshaft portion of said shaft; said yoke-collar including horizontal oscillation means coupling it to said driveshaft portion to periodically move said yoke-collar through substantially horizontal oscillation as said driveshaft portion rotates;

(iii) said link mechanism actuator connecting said yoke-collar to said link mechanism to pivot same and selectively move said diverter rollers between said normal and said diverter positions;

(iv) said lift mechanism and said swivel mechanism substantially synchronously lifting and pivoting said roller so that when said support means is in said first position said diverter roller is oriented in said normal position, and when said support means is in said second position said diverter roller is in said diverter position;

(h) whereby when support means is in said first position articles on said first conveyor engage said diverter roller and have momentum transferred to them by said diverter roller, thus facilitating movement of said articles past said diverter assembly and further along said first conveyor; and (i) whereby when said support means is in said second position said diverter roller engages said articles and lift and divert same toward said second conveyor, while simultaneously conveying momentum to said articles.

13. A diverter assembly according to claim 12 wherein:

(a) said yoke-collar is a cylindrical sleeve with a bore therethrough; and (b) said driveshaft portion of said shaft has a cylindrical surface with a track therein;

(i) said track defining a path circumscribing a portion of said cylindrical surface of said driveshaft portion and oblique to a circular cross-section of said driveshaft portion;

(ii) said yoke-collar having a follower mechanism associated therewith for following said track and periodically moving said yoke-collar through said substantially horizontal oscillation as said shaft rotates.

14. A diverter assembly for selectively diverting conveyed articles laterally from a generally horizontal conveyor having an article conveying surface, said diverter assembly comprising:
(a) a frame;
(b) at least one diverter roller having an article contacting surface and being positioned by said frame adjacent said conveyor for receiving articles therefrom;
(c) support means mounting said diverter roller on said frame and permitting movement of said diverter roller surface between a raised position above said conveyor surface and a lowered position;
  (i) said support means having a generally vertical roller yoke and post arrangement for rotatably supporting said roller;
(d) said support means including roller post pivoting means to pivot said roller post about a generally vertical axis for orienting said roller for article steering;
(e) an eccentric shaft associated with said support means and operable upon rotation thereof to motivate said roller and roller post between raised and lowered positions; and
(f) longitudinal drive means mounted on said eccentric shaft and adapted to reciprocate therealong upon rotation thereof;
  (i) said longitudinal drive means being in engagement with to said roller post, by means of a link mechanism, so as to produce said pivoting of said post in response to longitudinal drive means reciprocation;
(g) synchronizing means synchronizing said longitudinal drive means with said eccentric shaft and support means to simultaneously, selectively, pivot said roller post as said support means moves said roller and roller post between said raised and lowered positions;
(h) whereby said roller is simultaneously, selectively, raised and pivoted upon rotation of said eccentric shaft, to selectively divert articles from said horizontal conveyor.

15. A diverter assembly for selectively diverting conveyed articles from a first conveyor to an intersecting second conveyor, said diverter assembly comprising:
(a) a plurality of substantially continuously rotating diverter rollers;
(b) a lift mechanism for selectively motivating said rotating diverter rollers between raised and lowered positions;
  (i) articles upon said first conveyor generally engaging said rollers when said rollers are in either said raised or said lowered positions;
  (ii) said rollers when in said raised positions generally lifting engaged articles;
(c) a swivel mechanism for pivoting said diverter rollers between normal and diverter positions;
(d) a synchronizing mechanism for synchronizing said lift mechanism and said swivel mechanism;
  (i) said synchronizing mechanism orienting said rollers in said lowered position when said swivel mechanism orients said rollers in said normal positions;
  (ii) said synchronizing mechanism orienting said rollers in said raised position when said swivel mechanism orients said rollers in said diverter positions; and
  (iii) said synchronizing mechanism generally actuating said swivel mechanism and lift mechanism simultaneously, to simultaneously pivot said rollers during said raising and lowering; and
(e) an eccentric drive shaft simultaneously driving said lift mechanism, said swivel mechanism, and said synchronizing mechanism;
(f) whereby when said diverter rollers are in said lowered positions articles on said first conveyor engage said rollers and have momentum transferred to them by said diverter rollers, thus facilitating movement of said articles past said diverter assembly and further along the first conveyor; and
(g) whereby when said rollers are in said raised positions said rollers engage said articles and lift and divert same toward said second conveyor, while simultaneously conveying momentum to said articles.

16. A diverter assembly for selectively diverting conveyed articles from a first conveyor to an intersecting second conveyor, said diverter assembly comprising:
(a) a plurality of substantially continuously rotating diverter rollers;
(b) a lift mechanism for selectively motivating said rotating diverter rollers between raised and lowered positions;
  (i) articles upon said first conveyor generally engaging said rollers when said rollers are in either said raised or said lowered positions;
  (ii) said rollers when in said raised positions generally lifting engaged articles;
(c) a swivel mechanism for pivoting said diverter rollers between normal and diverter positions;
(d) a synchronizing mechanism for synchronizing said lift mechanism and said swivel mechanism;
  (i) said synchronizing mechanism orienting said rollers in said lowered position when said swivel mechanism orients said rollers in said normal positions; and
  (ii) said synchronizing mechanism orienting said rollers in said raised position when said swivel mechanism orients said rollers in said diverter positions;
(e) a selectively rotatable driveshaft having means associated therewith simultaneously driving said lift mechanism, said swivel mechanism, and said synchronizing mechanism;
(f) wnereby when said diverter rollers are in said lowered positions articles on said first conveyor engage said rollers and have momentum transferred to them by said diverter rollers, thus facilitating movement of said articles past said diverter assembly and further along the first conveyor; and
(g) whereby when said rollers are in said raised positions said rollers engage said articles and lift and divert same toward said second conveyor, while simultaneously conveying momentum to said articles.

* * * * *